United States Patent
Randl et al.

(10) Patent No.: US 6,332,375 B1
(45) Date of Patent: Dec. 25, 2001

(54) SAW BLADE SHARPENING MACHINE HAVING INDEPENDENTLY MOVABLE TOOTH GRINDING HEADS

(75) Inventors: Johann Randl, Sollenau (AT); Willi Motzer, Tübingen (DE)

(73) Assignee: Walter AG, Tübingen (DE)

( * ) Notice: Subject to any disclaimer, the term of this patent is extended or adjusted under 35 U.S.C. 154(b) by 0 days.

(21) Appl. No.: 09/452,888

(22) Filed: Dec. 2, 1999

(30) Foreign Application Priority Data

Dec. 3, 1998 (DE) .............................................. 198 55 773

(51) Int. Cl.[7] .................................................. B23D 63/12
(52) U.S. Cl. .......................................... 76/43; 76/37; 76/41
(58) Field of Search .................................... 76/37, 41, 42, 76/48, 50; 451/198, 193

(56) References Cited

U.S. PATENT DOCUMENTS 810,610 * 1/1906 Bishop ...................................... 76/50
6,109,137 * 8/2000 Lenard et al. ......................... 76/41 X

* cited by examiner

*Primary Examiner*—Douglas D. Watts
(74) *Attorney, Agent, or Firm*—Venable; Gabor J. Kelemen

(57) ABSTRACT

A saw blade sharpening machine includes a receiving and positioning chuck assembly for setting a saw blade in a grinding position in a plane corresponding to a main saw blade plane; and a grinding device which has a first and a second grinding head for grinding opposite tooth flanks of a saw tooth of the saw blade and an arrangement for moving the first and second grinding heads independently from one another towards and away from the saw blade plane in a direction perpendicularly thereto.

16 Claims, 5 Drawing Sheets

SAW BLADE SHARPENING MACHINE HAVING INDEPENDENTLY MOVABLE TOOTH GRINDING HEADS

CROSS REFERENCE TO RELATED APPLICATION

This application claims the priority of German Application No. 198 55 773.6 filed Dec. 3, 1998, which is incorporated herein by reference.

BACKGROUND OF THE INVENTION

The invention relates to a saw blade sharpening machine provided in particular for saw blades having hard-metal inserts.

In circular saw blades the teeth have to be laterally set off relative to the planar saw blade faces. Such an offset may be obtained by a setting of the teeth or a widening thereof, particularly in the region of the tooth face. Such a widening process is used in particular for saw blades having hard metal inserts. Each tooth carries at its leading side a hard metal piece on which the cutting edges of the tooth are formed. The frontal, forwardly-oriented edge face of the hard metal piece constitutes the tooth face, while its opposite, lateral surfaces define the tooth flanks. The principal cutting edge is defined between the tooth face and the tooth land. In many instances, in manufacturing or sharpening a saw blade, however, not only the principal cutting edge has to be provided or restored but also, the tooth flanks must be given a defined shape.

German Offenlegungsschrift (application published without examination) No. 42 44 180 discloses a grinding machine for the bilateral sharpening of tooth flanks of saw blades provided with hard metal inserts. The grinding machine has two grinding heads, each having a driven grinding disk supported for rotation about an axis. The axes of rotation of the two grinding heads are oriented parallel to one another. Each grinding head is supported on a linear guide whose direction of guidance forms an acute angle with the rotary axis of the grinding spindle. The guiding directions of the two linear guides determine the feed directions with which two sleds are simultaneously advanced to thus simultaneously grind both flanks of the tooth. The two guides are, in turn, carried by guiding sleds, by means of which the grinding heads are adjustable in a direction transverse to the saw blade. Both sleds are driven by a joint threaded spindle and are adjustable so that upon rotation of the threaded spindle the sleds are moved towards or away from one another.

The above-outlined conventional construction requires an accurate alignment of the saw blade with respect to a desired central plane. Such an arrangement may lead to problems particularly when the grinding machine is changed over to saw blades having different blade thicknesses.

German Patent No. 41 20 567 discloses a machine for a multi-stage machining of circular saw blades. The machine has a first grinding device provided with two grinding disks for the tooth flanks and a facing second grinding device having a grinding disk for the tooth land. The two grinding devices may be adjusted independently from one another. The grinding device for grinding the tooth flanks is designed such that the tooth flanks are simultaneously ground and the desired free tooth flank angle may be set according to requirements. The grinding disks are movable back and forth radially of the saw blade with a center sleeve by means of a piston-and-cylinder unit for positioning the grinding disks relative to the tooth flanks.

German Patent No. 41 13 854 shows a similar grinding machine for sharpening-saw blades. This machine too, has a grinding head with two grinding disks supported such that their rotary axes are parallel to one another. The grinding disks are used mainly for grinding the tooth land. The distance between the grinding disks is fixed. The two rotary shafts are supported in a rigid holder which may be pivoted about a pivot axis lying in the plane of the saw blade and which may be displaced in three mutually perpendicular directions. This construction is not adapted for the simultaneous grinding of both tooth flanks of one tooth.

SUMMARY OF THE INVENTION

It is an object of the invention to provide an improved saw blade sharpening machine which may be adapted in a simple manner to different tooth shapes and tooth sizes.

This object and others to become apparent as the specification progresses, are accomplished by the invention, according to which, briefly stated, the saw blade sharpening machine includes a receiving and positioning chuck assembly for setting a saw blade in a grinding position in a plane corresponding to a main saw blade plane; and a grinding device which has a first and a second grinding head for grinding opposite tooth flanks of a saw tooth of the saw blade and an arrangement for moving the first and second grinding heads independently from one another towards and away from the saw blade plane in a direction perpendicularly thereto.

Thus, the saw blade sharpening machine has a chuck assembly for receiving and positioning the saw blade by tightly clamping the saw blade in the grinding position. After completing the grinding work on one tooth or several teeth, the chuck assembly rotates the saw blade by one tooth division and again firmly clamps the saw blade in the successive working position.

According to the invention at least one work station has a grinding device provided with two grinding heads which are movable independently from one another transversely to the plane of the saw blade. For the displacement of the grinding heads displacing or driving devices preferably formed as numerically-controlled shafts (NC-shafts) are used. When the grinding disks of the two grinding heads are simultaneously in engagement with a tooth of the saw blade, the grinding motions of the two grinding heads may be controlled independently from one another. As a result, different special tooth shapes may be ground, and thus the saw blade sharpening machine is not configured specifically for particular tooth types. For example, tooth flanks may be ground which alternatingly project laterally from the saw blade plane to different distances, or saw blade teeth may be ground where wider teeth alternate with narrower teeth. Further, the saw blades may be of uniform or non-uniform pitch. The axial thickness of the saw blade to be worked and thus the position of the central plane of the saw blade have only a subordinated role. The two grinding heads provided for grinding the tooth flanks may be separately moved to the desired respective positions. Such a feature permits a high-diversity use of the saw blade sharpening machine even in case of unusual tooth shapes and alternating tooth sizes. The grinding disks may be moved along very complicated curves by numeric control.

Further, if required, a feed motion transversely to the saw blade plane may be effected so that with relatively few setting axes and unitary grinding disks different tooth shapes and particularly different free angles at the tooth flanks may be produced. The free angles may be obtained by superposing a feed motion oriented transversely to the saw blade plane with a further motion of the respective grinding head.

If required, the grinding heads may be arranged for a linear displacement radially to the saw blade or tangentially to its circumference. For such displacements preferably NC-shafts are used, whereby a complete computer control of the grinding motion is possible. As a result, for the two grinding heads essentially any desired motion curve may be obtained by providing a total of four displacement shafts: for the motion of the grinding heads transversely to the blade plane each grinding head has its own, separate displacement shaft, whereas for the radial and tangential motions the two grinding heads have common displacement shafts. By combining the motion of the two grinding heads in the radial direction and in the tangential direction in a single NC-shaft each, the required setting devices are reduced to a low number, resulting in a clear arrangement, a simple construction and a superior grinding accuracy. In particular, none of the grinding heads have more than three sequential setting possibilities.

In addition to the grinding heads for the tooth flanks, one or more grinding heads for a separate grinding of the tooth land and/or tooth face may be provided. Such grinding heads are movable by at least two shafts. The displacement direction of one shaft is approximately radial to the saw blade plane, while the displacement direction of the other shaft is oriented approximately tangentially to the blade circumference. In addition, a pivot shaft arranged perpendicularly to the saw blade plane and/or a linear shaft with a linear displacement direction that is perpendicular to the saw blade axis may be provided. By superposing the individual shaft motions the grinding head displacements may be achieved in a substantially arbitrary direction, permitting the working of complex tooth configurations which are not set by the design of the saw blade sharpening machine.

The rotary axes of the grinding disks of the grinding heads are preferably parallel to the main center plane of the saw blade. In addition, the rotary axes are preferably parallel to one of the displacement directions of the grinding heads. For example, the rotary axes of the grinding heads for the tooth flanks are oriented essentially radially to the saw blade plane. Both grinding heads are preferably jointly moved in such a direction, while they are movable independently from one another perpendicularly to the saw blade, that is, towards or away therefrom.

The saw blade is preferably held in a central chuck assembly to which the saw blade is firmly secured. According to a preferred embodiment of the invention, the receiving device is coupled with an NC-shaft by means of which the saw blade may be moved in any desired angular position and may be immobilized therein. In this manner a particularly simple switchover to different tooth sizes and an adaptation to alternating tooth divisions are feasible.

BRIEF DESCRIPTION OF THE DRAWINGS

FIG. 1a is a view of the FIG. 1 construction, taken parallel to the saw blade plane in the direction of the arrow Ia of FIG. 1.

FIG. 2a is a view of the FIG. 2 construction, taken parallel to the saw blade plane in the direction of the arrow IIa of FIG. 2.

FIG. 3a is a view of the FIG. 3 construction, taken parallel to the saw blade plane in the direction of the arrow IIIa of FIG. 3.

DESCRIPTION OF THE PREFERRED EMBODIMENTS

Figure 1:
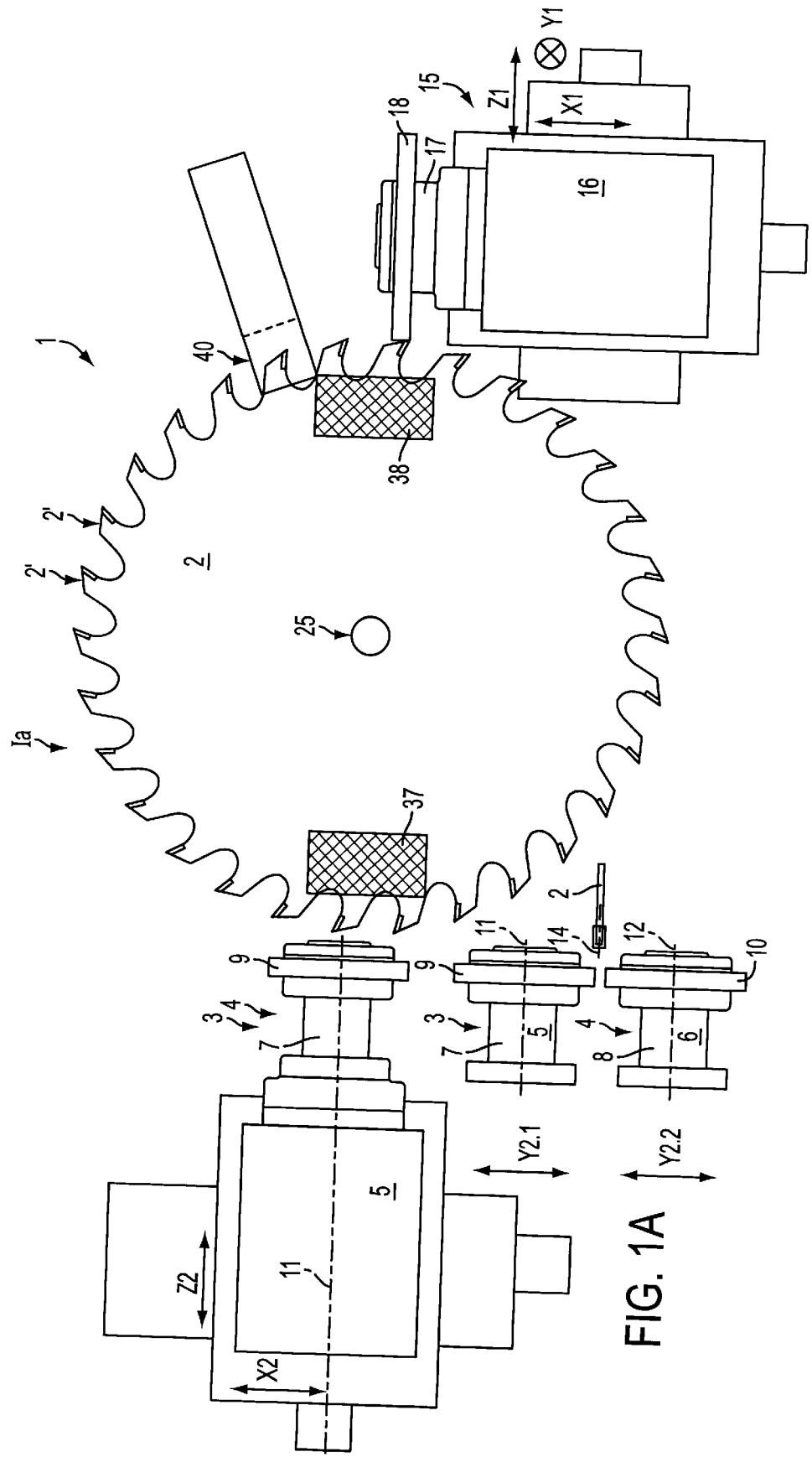
FIG. 1 is a side elevational view of a saw blade sharpening machine in a basic schematic illustration, including two grinding heads for grinding the tooth flanks and one grinding head for grinding the tooth land.

FIG. 1 shows a saw blade sharpening machine 1 illustrated by its grinding heads and a circular saw blade 2 positioned to be sharpened thereby. The saw blade sharpening machine 1 has two grinding heads 3 and 4 (only one grinding head is visible). FIG. 1a shows the grinding heads 3 and 4 and a fragment of the saw blade 2 as seen in the direction of the arrow Ia shown in FIG. 1. The grinding heads 3 and 4 are of identical construction; they have a respective servomotor 5, 6 whose respective drive shaft 7, 8 carries a respective grinding disk 9, 10. The drive shafts 7, 8 are rotatable about parallel-oriented rotary axes 11 and 12 which, in turn, are arranged parallel to a central plane 14 of the saw blade 2.

The two grinding heads 3 and 4 are movable independently from one another by a respective NC-shaft Y2.1 and Y2.2 in a vertical direction along a motion path Y2.1 and Y2.2 respectively, that is, perpendicularly to the saw blade plane 14. Both NC-shafts Y2.1 and Y2.2 are controlled by a non-illustrated central control unit. The NC-shafts Y2.1 and Y2.2 are preferably mounted on a joint carrier which, in turn is movable by NC-shafts X2 and Z2 in the saw blade plane 14 along respective motion paths X2 and Z2. The NC-shaft Z2 provides for a motion radially to the saw blade 2, while the NC-shaft X2 provides for a motion which is tangential to the circumferential direction of the circular saw blade 2. The two NC-shafts X2 and Z2 too, are controlled by the central control unit.

The saw blade sharpening machine 1 has a further grinding head 15.which serves for grinding the tooth land of the individual teeth 2' of the saw blade 2. The grinding head 15 has a drive constituted by a servomotor 16 having a drive shaft 17 which carries a grinding disk 18 having a cylindrical external contour. The grinding head 15 is movable in the direction X1 tangentially to the circumference of the saw blade 2 by an NC-shaft X1, in the direction Y1 parallel to the rotary axis of the saw blade 2 by an NC-shaft Y1 and in the direction Z1 radially to the saw blade 2 by an NC-shaft Z1. The NC-shafts X1, Y1 and Z1 are operated independently from one another by means of respective servomotors operated by the central control device. The motions of the grinding head 15 are controllable independently from the motions of the grinding heads 3 and 4.

Figure 4:
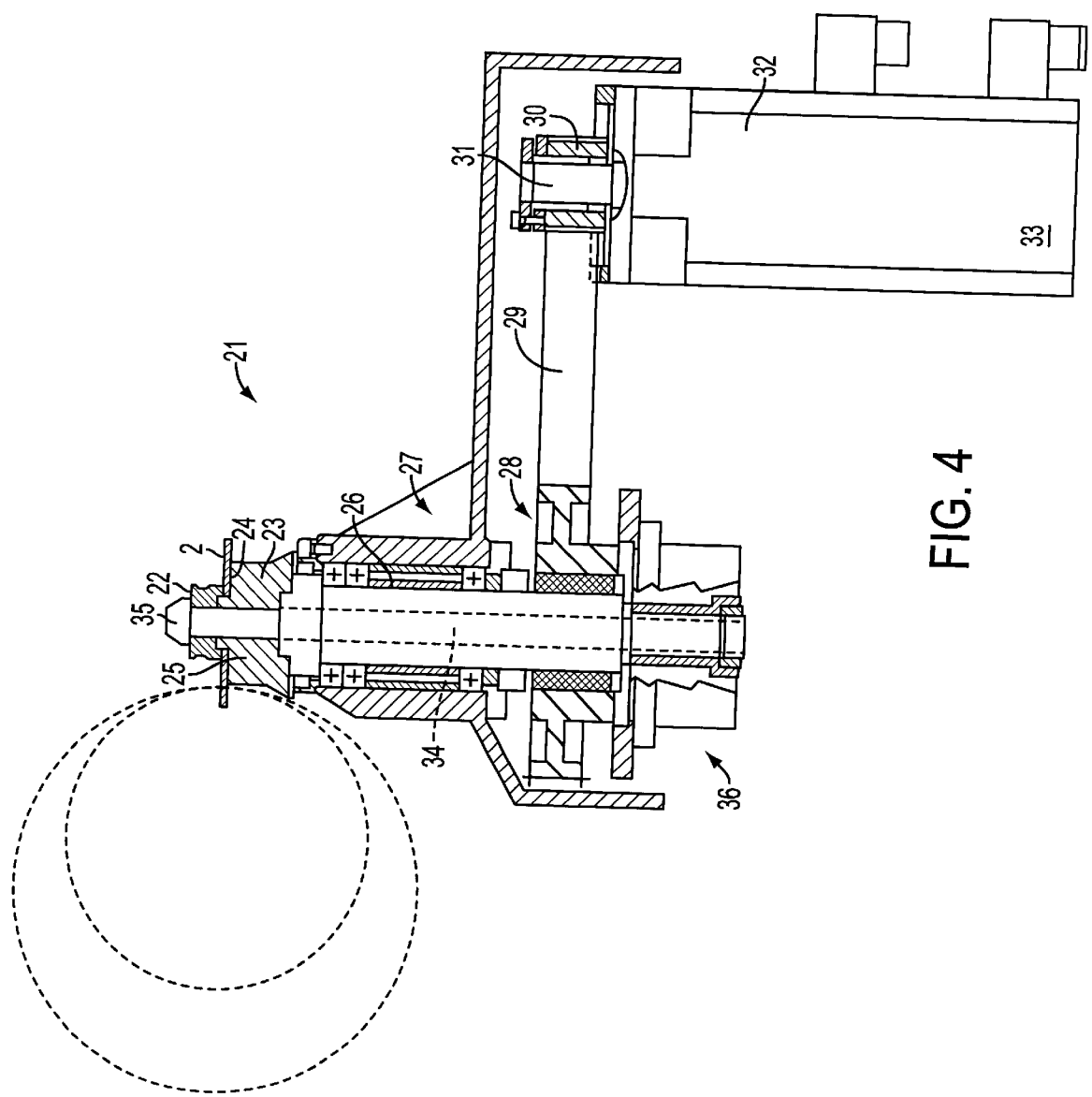
FIG. 4 is a sectional side elevational view of a saw blade-receiving chuck assembly forming part of the saw blade sharpening machines illustrated in FIGS. 1, 2 and 3.

Turning to FIG. 4, for supporting the saw blade 2 a chuck assembly 21 is provided which has two clamping shoes 22, 23 for centrally fixedly clamping the saw blade 2. The lower clamping shoe 23 has an upper supporting face 24 for seating the saw blade 2. A collar 25 projects centrally from the supporting face 24 and serves for centering the saw blade 2. The clamping shoe 23 is held on a shaft 26 which is rigidly affixed to a carrying device 27. To that end of the shaft 26 which is remote from the clamping jaw 23 a sprocket 28 is mounted which is coupled by a toothed belt 29 with a sprocket 30 which, in turn, is mounted on the drive shaft 31 of a servomotor 32. The servomotor 32 coupled in this manner by means of a gearing with the clamping shoe 23 determines each rotary (angular) position of the clamping shoe 23. The servomotor 32 is connected with an encoder 33. The encoder 33 and the servomotor 32 are connected with the central control and constitute an NC-shaft. In addition or as an alternative, the shaft 26 may be provided with an encoder.

Through the hollow shaft 26 a tension pin 34 passes which traverses the clamping shoe 23 and has, at a distance therefrom, a head 35 whose diameter does not exceed the outer diameter of the collar 25. The clamping shoe 22 may be laterally open to form a structure similar to a U-shaped yoke and may be pushed underneath the head 35 to clamp the saw blade 2 against the supporting face 24 of the clamping shoe 23. For operating the tension pin 34, the latter projects beyond the sprocket side end of the hollow shaft 26 and is coupled with an actuating device 36 which may be operated pneumatically, electrically or hydraulically.

For setting the saw blade 2 in the grinding positions and for supporting the saw blade 2 such that its teeth can be brought into the working range of the grinding heads, underneath the saw blade 2, in the vicinity of the grinding heads 3 and 4 and the grinding head 15 respective support members 37 and 38 are positioned which contain respective electromagnets. By means of the electromagnets the saw blade 2 is pulled against a planar surface provided on the support members 37, 38 during the working of the teeth 2' to thus immobilize the saw blade 2. In the alternative, conventional mechanical clamping devices may be used. The support members 37 and 38 or the clamping devices used in the alternative are controlled by the central control device of the saw blade sharpening machine 1.

A sensor 40 is provided in the region of the circumference of the saw blade 2 for detecting the tooth division. Such a sensor may be an electrooptical sensor such as an optical barrier or a mechanical or magnetic sensor. The sensor 40 is connected directly with the central machine control and applies thereto a signal which represents the tooth division and, if required, may apply a signal representing the tooth position and thus the angular position of the saw blade 2.

In the description which follows the operation of the above-described saw blade sharpening machine 1 will be set forth.

For clamping the saw blade 2, first all the grinding heads 3, 4 and 15 are moved far outwardly in their respective radial directions Z1, Z2. Thereafter the saw blade 2 is positioned on the chuck assembly 21 such that its central opening is positioned over the collar 25 and the saw blade 2 lies on the supporting face 24 of the clamping shoe 23. After inserting the clamping shoe 22 the clamping device 36 is actuated and the saw blade 2 is firmly clamped. In case the tooth division is not known, the central control device actuates the servomotor 32 for rotating the saw blade 2. During this occurrence the sensor 40 detects one or more teeth as they pass by, and from the signals emitted by the sensor 40 the central control device determines the tooth division. Further, in case the sensor 40 is displaceable in a radial direction, that is, it is movable with an NC-shaft, the diameter of the saw blade may be determined if not already known.

Subsequently, the saw blade 2 is rotated into a first position in which a tooth 2' is situated in the vicinity of the grinding heads 3 and 4 and a diametrically oppositely located tooth is situated in the vicinity of the grinding head 15. This position is held by the servomotor 32, and the magnetic supports 37, 38 are energized to attract and immobilize the saw blade 2. According to a predetermined grinding program, the grinding heads 3 and 4 are shifted in the radial direction Z2 on which, if required, a motion X2 in the tangential direction is superposed by actuating the respective NC-shaft X2. The NC-shafts Y2.1 and Y2.2 serve to move the grinding heads 3 and 4 during the common feeding motion independently from one another towards the desired tooth flank. While the grinding heads 3 and 4 are moved along the respective tooth synchronously in a radial direction or obliquely to such a direction, the NC-shafts Y2.1 and Y2.2 are controlled and monitored separately.

At the same time, the central control device guides the grinding head 15 in such a manner that by superposing the motion of the NC-shafts X1, Y1 and Z1 the desired grinding of the tooth land is effected by guiding the grinding disk 18 once or several times over the land surface of the respective tooth. Particularly by the motion of the NC-shaft Y1 planar tooth land surfaces are obtained. The NC-shaft Y1 effects a motion tangentially to the circumferential direction of the grinding disk 18 relative to the contacting parts between the tooth and the grinding disk 18.

Figure 2:
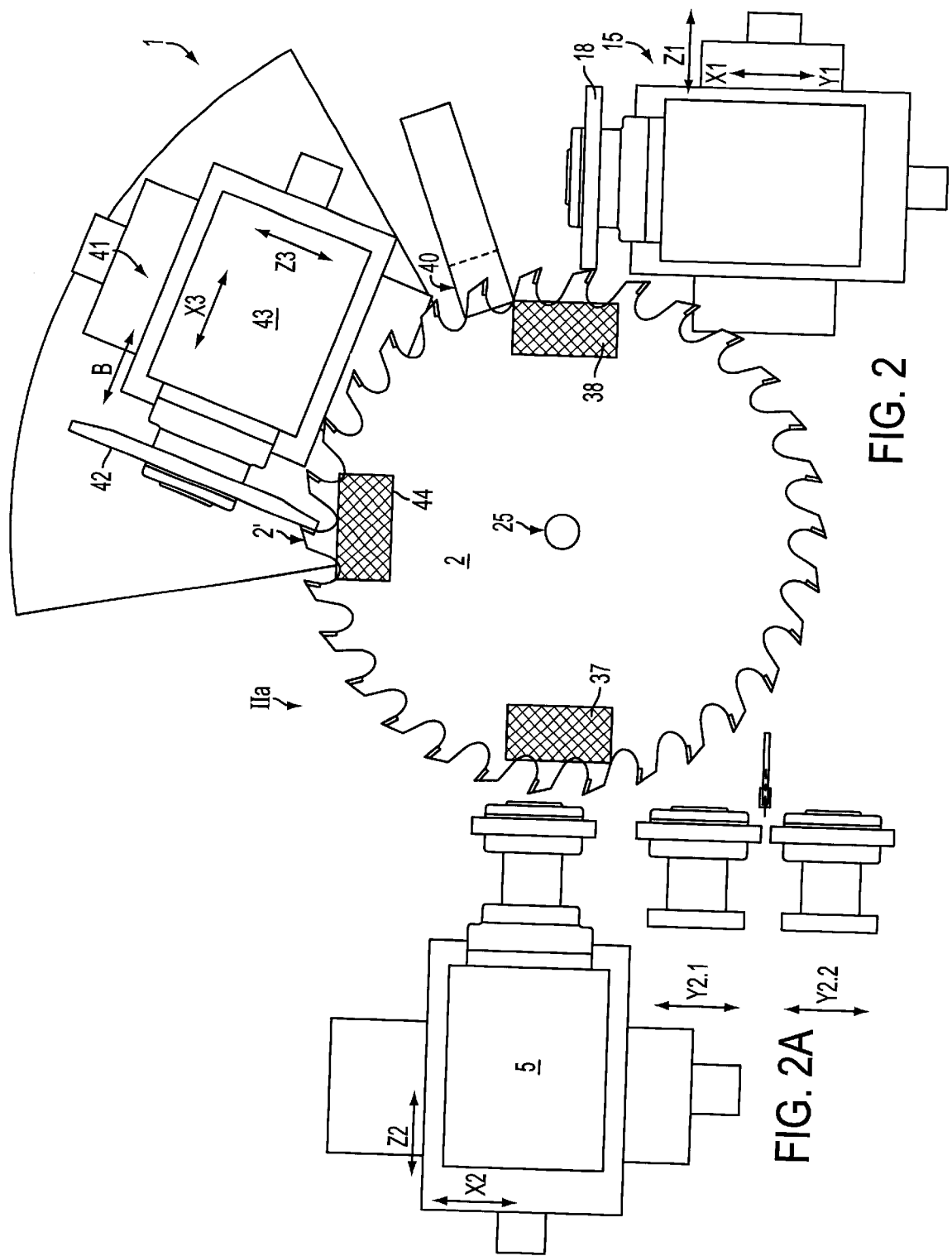
FIG. 2 is a view similar to FIG. 1, showing, in a basic schematic illustration, an additional grinding head for grinding the tooth face.

While the saw blade sharpening machine 1 shown in FIG. 1 grinds only the tooth flanks and the tooth lands, the construction shown in FIG. 2 additionally grinds the tooth face. As concerns the grinding heads 3, 4 and 15, they are identical in the two machines. In addition, however, a further grinding head 41 with a plate-like grinding disk 42 is provided. The grinding heads 3, 4, 15 and 41 may be spaced about the saw blade 2, for example, at 90° or, if required, at another angle, for example, at 120° from each other. The grinding head 41 has a servomotor 43 which is controlled by the central control unit and which drives the grinding disk 42 whose planar surface serves for grinding the tooth face. The grinding head 41 is supported by a carrier which may be moved by means of two NC-shafts X3 and Z3 relative to the tooth 2' to be worked on in a radial (Z3) and a tangential (X3) direction. In addition a pivotal NC-shaft B may be provided about which the grinding head 41 may be pivoted. The motion effected by the NC-axis B is oriented perpendicularly to the mid plane 14 of the saw blade 2. All three NC-shafts X3, Z3 and B are controlled by the central control device.

For supporting the tooth 2' worked on by the grinding head 41 a further magnetic workpiece support 44 is provided which is controlled by the central control unit similarly to the workpiece supports 37 and 38.

Figure 3:
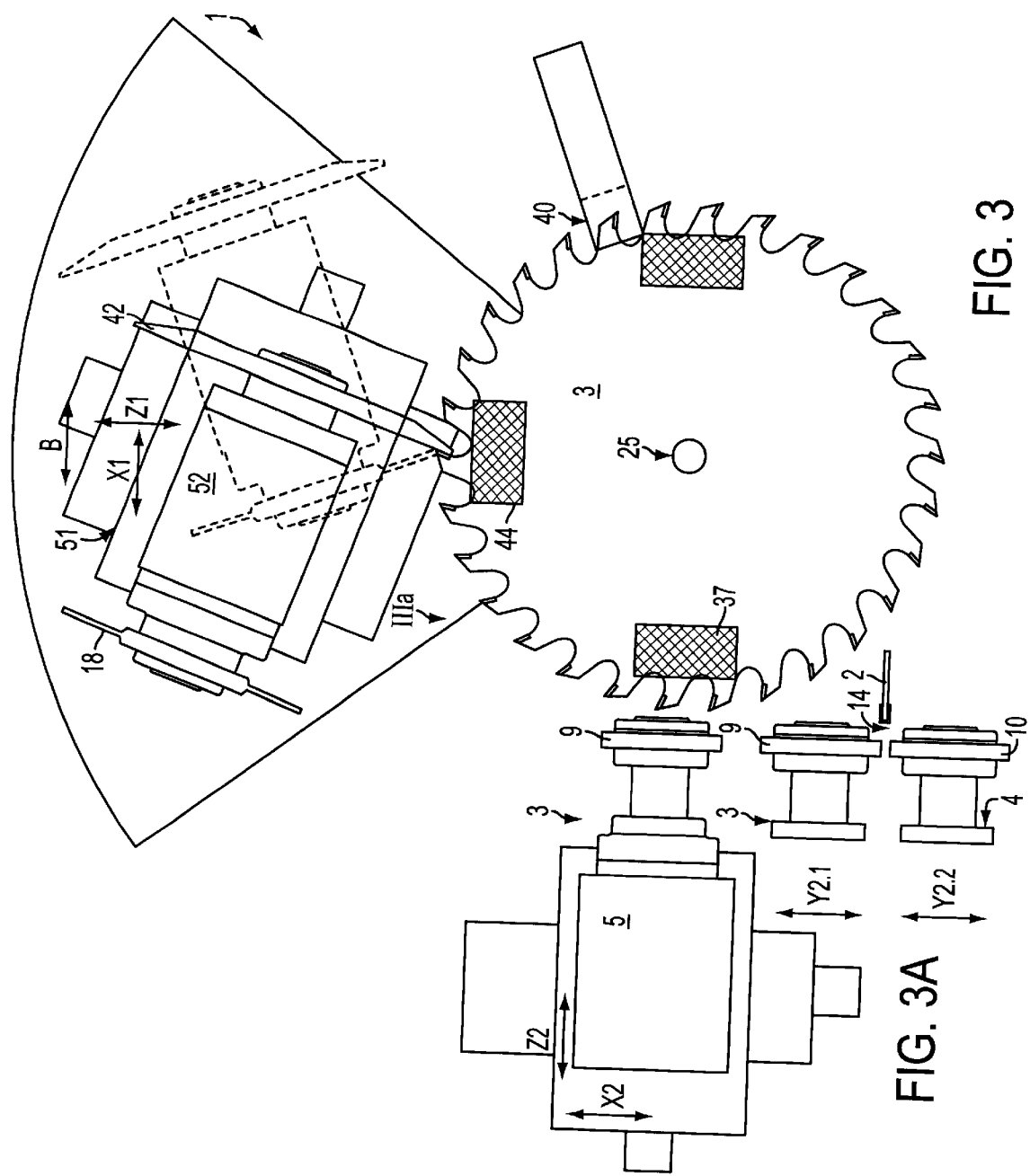
FIG. 3 is a schematic side elevational view of another embodiment of a saw blade sharpening machine according to the invention, having two grinding heads for grinding the tooth flanks and a combined grinding head for grinding the tooth land and the tooth face.

FIG. 3 schematically shows a further embodiment of the saw blade sharpening machine 1. The FIG. 3 embodiment differs particularly from the FIG. 2 embodiment in that the grinding heads 14 and 41 are combined into a single grinding head 51 which is situated at the location of the grinding head 41 of FIG. 2 and which, if required, may also be arranged at another position, for example, in the position of the grinding head 15 of FIG. 2. The grinding head 51 is movable in the direction of the three linear axes X1, Y1 and Z1 of the grinding head 15. In addition, the grinding head 51 is pivotal about the axis 8 of the grinding head 41. The grinding head 51 has, as a drive, a servomotor 52 or another electromotor which drives both grinding disks 18 and 42. The latter may be arranged on a shaft at a distance from one another. Preferably, they are arranged at opposite ends of a throughgoing shaft of the drive motor 52. As shown in FIG. 3, the grinding disks 42 and 18 may be brought sequentially into engagement with the tooth 2'. For this purpose, a combined shifting and pivotal motion is required which is achieved by a coordinated control of the NC-shafts X1, Z1 and B.

In addition, a non-illustrated further NC-shaft may be provided which makes possible a pivotal motion about the direction defined by Z1. Such an arrangement makes possible a grinding of the tooth face at an axial angle.

Figure 5:
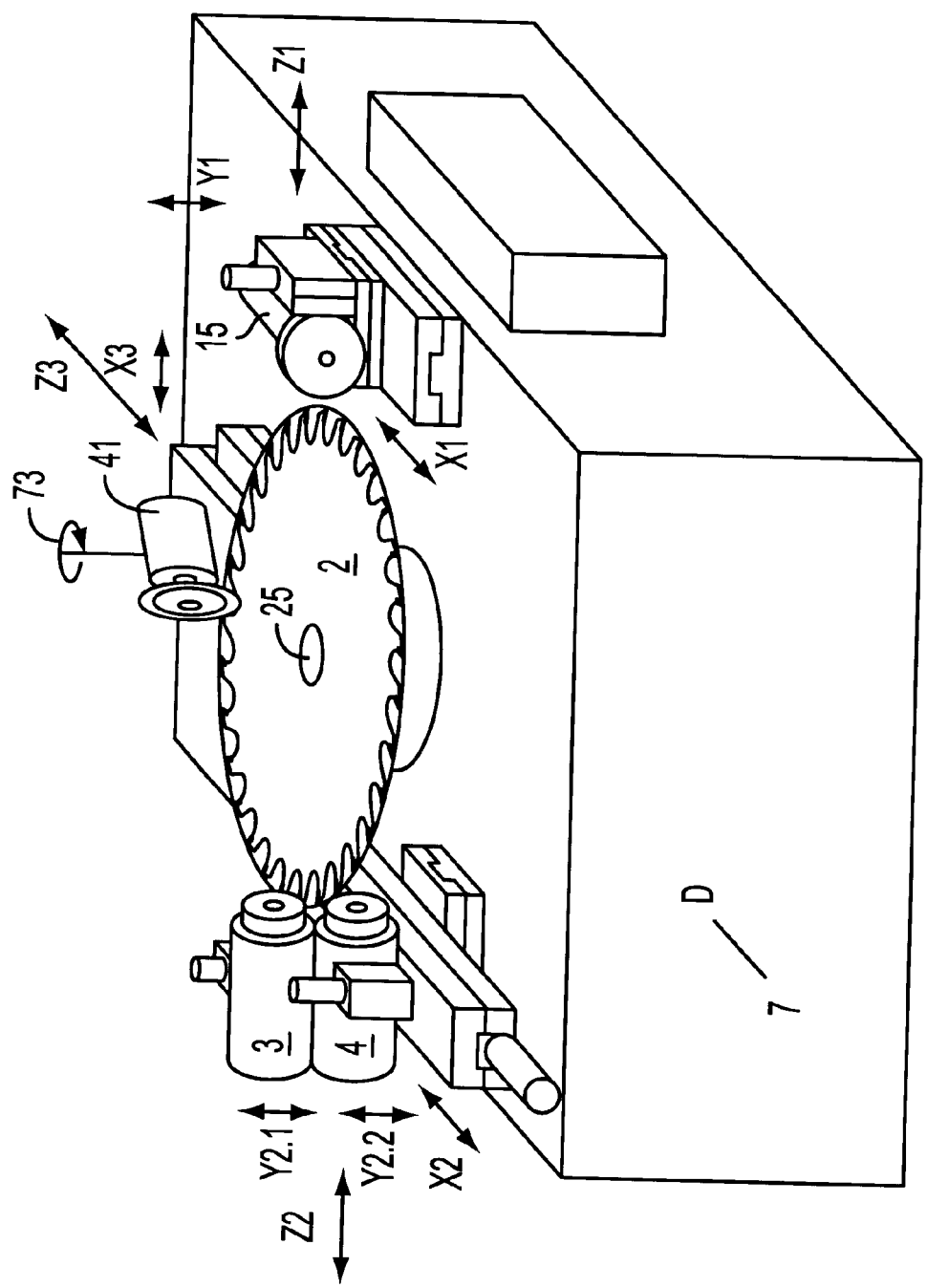
FIG. 5: perspective view of a saw blade sharpening machine having a plurality of grinding heads movable independently by CNC-axis.

FIG. 5 schematically illustrates a saw blade grinding or sharpening machine having four grinding heads 3, 4, 15, 41 which are also shown in FIGS. 2 and 2a. All grinding heads are supported by cross slides which allow a movement in radial directions Z1, Z2, Z3 and in tangential directions X1, X2, X3. Additionally grinding head 41 is rotatably mounted and may pivot around an axis B. Grinding heads 3, 4 and 15 are movable in vertical directions Y2.1, Y2.2 and Y1. Electric motors are provided for the movements in all directions mentioned. The electric motors are controlled by a control unit (CNC Control Unit in FIG. 5) which preferably incorporates a microprocessor. Thus the motors are controlled numerically and, together with the slides or other guiding means, form numerically controlled (NC or CNC) axes.

It will be understood that the above description of the present invention is susceptible to various modifications, changes and adaptations, and the same are intended to be comprehended within the meaning and range of equivalents of the appended claims.

What is claimed is:

1. A saw blade sharpening machine for sharpening a circular saw blade; comprising
   (a) a receiving and positioning chuck assembly for setting a saw blade in a grinding position in a plane corresponding to a main saw blade plane; said chuck assembly defining a radial direction and a circumferential direction of the saw blade when installed in said chuck assembly; and
   (b) a grinding device including
      (1) a first and a second grinding head for grinding opposite tooth flanks of a saw tooth of said saw blade;
      (2) means for moving said first and second grinding heads independently from one another towards and away from said plane in a direction perpendicularly thereto; said means for moving said first and second grinding heads perpendicularly to said plane comprising
         (i) a first means for moving said first grinding head along a first linear path Y2.1; and
         (ii) a second means for moving said second grinding head along a second linear path Y2.2;
      (3) a third means for moving said first and second grinding heads along a third linear path Z2 parallel to said plane and parallel to said radial direction; and
      (4) a fourth means for moving said first and second grinding heads along a fourth linear path X2 parallel to said plane and tangentially to said circumferential direction.

2. A saw blade sharpening machine comprising
   (a) a receiving and positioning chuck assembly for setting a saw blade in a grinding position in a plane corresponding to a main saw blade plane; and
   (b) a grinding device including
      (1) a first and a second grinding head for grinding opposite tooth flanks of a saw tooth of said saw blade;
      (2) means for moving said first and second grinding heads independently from one another towards and away from said plane in a direction perpendicularly thereto;
      (3) a third grinding head spaced from said first and second grinding heads and being provided with a grinding disk;
      (4) means for moving said third grinding head independently from said first and second grinding heads; said means for moving said third grinding head including means for moving said third grinding head in a first direction and in a second direction perpendicular to said first direction; said first and second directions lying in said plane.

3. A saw blade sharpening machine comprising
   (a) a receiving and positioning chuck assembly for setting a saw blade in a grinding position in a plane corresponding to a main saw blade plane; said chuck assembly including
      (1) a clamping device for receiving and clamping the saw blade;
      (2) means for rotatably supporting said clamping device; and
      (3) drive means for stepwise moving said clamping means for stepwise positioning the saw blade; and
   (b) a grinding device including
      (1) a first and a second grinding head for grinding opposite tooth flanks of a saw tooth of said saw blade; and
      (2) means for moving said first and second grinding heads independently from one another towards and away from said plane in a direction perpendicularly thereto.

4. The saw blade sharpening machine as defined in claim 1, wherein said first and second means are separate from one another and said third and fourth means are common for said first grinding head and are common for said second grinding head.

5. The saw blade sharpening machine as defined in claim 1, wherein said first and second grinding heads each include a rotatably driven grinding disk and further wherein each driving disk has a rotary axis oriented parallel to said plane.

6. The saw blade sharpening machine as defined in claim 5, wherein the direction of independent motion of said first and second grinding heads is oriented perpendicularly to said rotary axes of said grinding disks.

7. The saw blade sharpening machine as defined in claim 1, wherein said first and second grinding heads each include a rotatably driven grinding disk and further wherein each driving disk has a rotary axis oriented parallel to one another.

8. The saw blade sharpening machine as defined in claim 7, wherein the rotary axes lie in a common plane.

9. The saw blade sharpening machine as defined in claim 2, wherein the saw blade is circular and said chuck assembly defines a radial direction and a circumferential direction of the saw blade when installed in said chuck assembly; and further wherein one of said first and second directions is oriented radially with respect to a tooth of the saw blade positioned to be ground.

10. The saw blade sharpening machine as defined in claim 2, wherein the saw blade is circular and said chuck assembly defines a radial direction and a circumferential direction of the saw blade when installed in said chuck assembly; and further wherein one of said first and second directions is oriented tangentially to said circumferential direction.

11. The saw blade sharpening machine as defined in claim 2, further comprising means for moving said third grinding head in a third direction perpendicularly to said plane.

12. The saw blade sharpening machine as defined in claim 2, further comprising means for pivoting said third grinding head about a rotary axis perpendicular to said first and second directions.

13. The saw blade sharpening machine as defined in claim 12, wherein said rotary axis is perpendicular to said plane.

14. The saw blade sharpening machine as defined in claim 2, further comprising a fourth grinding head spaced from said first and second grinding heads and being provided with a grinding disk; means for moving said fourth grinding head independently from said first and second grinding heads in a third direction and in a fourth direction perpendicular to said third direction; said third and fourth directions lying in said plane; one of said third and fourth grinding heads is arranged for grinding tooth lands and the other of said third and fourth grinding heads is adapted to grind tooth faces.

15. The saw blade sharpening machine as defined in claim 1, wherein said means for moving said first and second grinding heads include numerically controlled means.

16. The saw blade sharpening machine as defined in claim 3, further comprising numerically controlled means for controlling said drive means.

* * * * *